(12) United States Patent
Kim et al.

(10) Patent No.: US 6,385,188 B1
(45) Date of Patent: May 7, 2002

(54) METHOD FOR SHARING CHANNELS BETWEEN BASE STATION SECTORS AND FREQUENCY ASSIGNMENTS IN CODE DIVISION MULTIPLE ACCESS SYSTEM

(75) Inventors: Byeong-Woo Kim, Buchun; Byung-chul You, Seoul, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/373,168

(22) Filed: Aug. 12, 1999

(30) Foreign Application Priority Data

Aug. 13, 1998 (KR) .............................. 98-32812

(51) Int. Cl.$^7$ ................................ H04J 13/00
(52) U.S. Cl. ...................... 370/342; 370/329
(58) Field of Search ................ 370/329, 334, 370/335, 342, 479; 455/453, 454, 447

(56) References Cited

U.S. PATENT DOCUMENTS 5,437,054 A * 7/1995 Rappaport et al. ......... 455/33.1
6,266,529 B1 * 7/2001 Chheda ...................... 455/436

* cited by examiner

*Primary Examiner*—Douglas Olms
*Assistant Examiner*—Ken Vanderpuye
(74) *Attorney, Agent, or Firm*—Steve Cha; Klauber & Jackson

(57) ABSTRACT

A method for reducing the number of channel cards in a base station by sharing channels between a plurality of frequency assignments and between a plurality of sectors of the base station during a traffic overload in a code division multiple access (CDMA) system of the type having a plurality of cells with each cell containing the sectors and each sector having a group of traffic channels and a group of frequency assignments to it that is same as the group of frequency assignments to other said sectors within that same cell, the method comprising the step of setting traffic channels to accommodate requests within the base station, the step of determining whether said set traffic channels are to be shared between the frequency assignments and/or between the sectors, in the event that the set channels are shared only between the frequency assignments, the step of determining the number of channel cards by calculating $$\frac{XY}{W},$$

in event that the set channels are shared between frequency assignments and between sectors, the step of determining the number of channel cards by calculating $$\frac{kXY}{W},$$

wherein X represents the sum of the set traffic channels and the overhead channels, Y represents the number of FAs and W represents the number of total channels per each channel card, the step of setting the set channels to the channel cards, and sharing channels using the set channel card between the sectors and between frequency assignments.

5 Claims, 3 Drawing Sheets

METHOD FOR SHARING CHANNELS BETWEEN BASE STATION SECTORS AND FREQUENCY ASSIGNMENTS IN CODE DIVISION MULTIPLE ACCESS SYSTEM

CLAIM OF PRIORITY

This application makes reference to, incorporates the same herein, and claims all benefits accruing under 35 U.S.C. §119 arising from an application entitled, METHOD FOR SHARING CHANNELS BETWEEN BASE STATION SECTORS AND FREQUENCY ASSIGNMENTS IN CODE DIVISION MULTIPLE ACCESS SYSTEM, earlier filed in the Korean Industrial Property Office on Aug. 13, 1998, and there duly assigned Serial No. 1998-032812.

FIELD OF THE INVENTION

The present invention relates to a method for sharing channels between the sectors of a base station and between Frequency Assignments (FAs) in Code Division Multiple Access (CDMA) system. More particularly, the present invention relates to a method for the base station to share channels from adjacent cellular base stations or between frequency assignments therebetween, which helps to reduce numbers of channel cards used in the base station.

DESCRIPTION OF THE RELATED ART

A cellular mobile telecommunication system makes it possible for more subscribers to communicate with each other by improving the efficiency in the amount of traffic capacity that can be carried in allocated radio spectrum bands. As a demand for cellular service grows, operator of such system attempts to make maximum effective use of the available radio frequency bandwidth in order to accommodate the service demand.

A cell division technology is widely used to improve the efficiency in frequency reuse. One of the known cell division technologies is a sectorization. In such a method, a cell is generally divided into three equal parts ($\alpha$, $\beta$, and $\gamma$ sector) by spacing three 120 degrees antennas. Presently, the CDMA system assigns a group of traffic channels to each sector in the base station, and one of these traffic channels of the corresponding sector is assigned to the traffic in the event that a subscriber is accessing the system to establish a communication link. However, as the number of the subscribers grow rapidly in a given sector, there is a strong interest to enhance the system capacity for a given grade of service. This can be achieved by using surplus traffic channels in other sectors that are not being used. Some schemes have been developed to share the channels between sectors to accommodate user communication overloads that occur within a particular cellular region.

One of the prior arts used for sharing channels of the CDMA system involves reserving a group of traffic channels for borrowing during regional overloads, where it has been saturated. If the traffic overload occurs in a specific sector, one of the reserved traffic channels is borrowed by the sector where the traffic overload occurred. Accordingly, such method for sharing channels allows the $\alpha$, $\beta$, $\gamma$ sectors to share/borrow from a group of reserved traffic channels, indiscriminately.

Another known art involves sharing of unassigned frequency bands to provide communications service during the traffic overloads. As the number of subscribers grows the sector accommodates more subscribers by using frequency assignment process, which attempts to avoid assigning the same frequency to each mobile station. If the number of subscribers is added, the sector provides the new mobile station with a new frequency assignment that is available for use. Each FA has its own codes, different from each other, serving to provide various traffic channels. The systems then share the unassigned frequency bands to accommodate the overload.

As discussed in the above, there is provided in the prior arts for sharing channels only between the sectors in the CDMA system. However, so far there exists no method for sharing channels between FA (namely 1FA, 2FA, 3FA, etc) for reducing the numbers of packaged channel cards in a base station.

Since the demand for channels to serve users of cellular communication system is expected to grow rapidly in the near future, there is a strong interest to develop techniques that would enhance the system utility and simplicity, and lighter and less complex system.

SUMMARY OF THE INVENTION

The object of present invention is to improve the simplicity, complexity, and weight of the system, through reducing the numbers of packaged channel cards required in the system by sharing channels between frequency assignments and between sectors.

Other objects and advantages of the present invention will become apparent with reference to the following detailed description and the attached drawings.

One of the preferred embodiment of a channel-sharing method between base station sectors and frequency assignments (FAs) in code division multiple access (CDMA) system, the method comprising the steps of:

setting traffic channels to accommodate the subscribers' traffic occurred in the base station;

determining whether the set channels are to be shared between only FAs after setting the traffic channels;

in case the set channels are shared only between FAs, obtaining Z the number of channel cards by $$\frac{XY}{W},$$

wherein X is the sum of the set traffic channels and the overhead channels, Y is the number of FAs and W is the number of total channels per each channel card;

setting the set traffic channels to the channel cards and sharing channels using the set channel card only between FAs;

in case sectors and channels are shared between the FAs and between the sectors, obtaining Z, by calculating $$\frac{kXY}{W},$$

wherein k is the number of sectors; and setting the traffic channels to the channel cards and sharing channels using the set channel card between the sectors and FAs.

And it is preferable that in case channels are shared only between FAs, Z is obtained by calculating $$k \times \text{CEILING FUNCTION}\left(\frac{XY}{W}\right).$$

It is preferable that in case channels are shared between sectors and between FAs, Z is obtained by calculating $$\text{CELILNG FUNCTION}\left(\frac{kXY}{W}\right).$$

Another preferred embodiment of a channel-sharing method between base station sectors and frequency assignments in code division multiple access (CDMA) system, the base station having a plurality of sectors and operating a plurality of FAs to provide mobile communication services by sharing the channels between the sectors during the traffic overlaods, and that the number of channel cards (Z) is obtained by calculating $$k \times \text{CEILING FUNCTION}\left(\frac{XY}{W}\right),$$

where X represents the sum of the set traffic channels and the overhead channels, Y represents the number of FAs, W represents the number of total channels per each channel card and k is the number of sectors.

Other preferred embodiment of a channel-sharing method between base station sectors and frequency assignments (FAs) in code division multiple access (CDMA) system, the base station having a plurality of sectors and operating a plurality of FAs to provide mobile communication service by sharing the channels between the sectors and between the plurality of FAs during the traffic overloads, and the number of channel cards (Z) is obtained by calculating $$\text{CEILING FUNCTION}\left(\frac{kXY}{W}\right),$$

where X represents the sum of the set traffic channels and the overhead channels, Y represents the number of FAs, W represents the number of total channels per each channel card and k is the number of sectors.

DETAILED DESCRIPTION OF THE INVENTION

Figure 1:
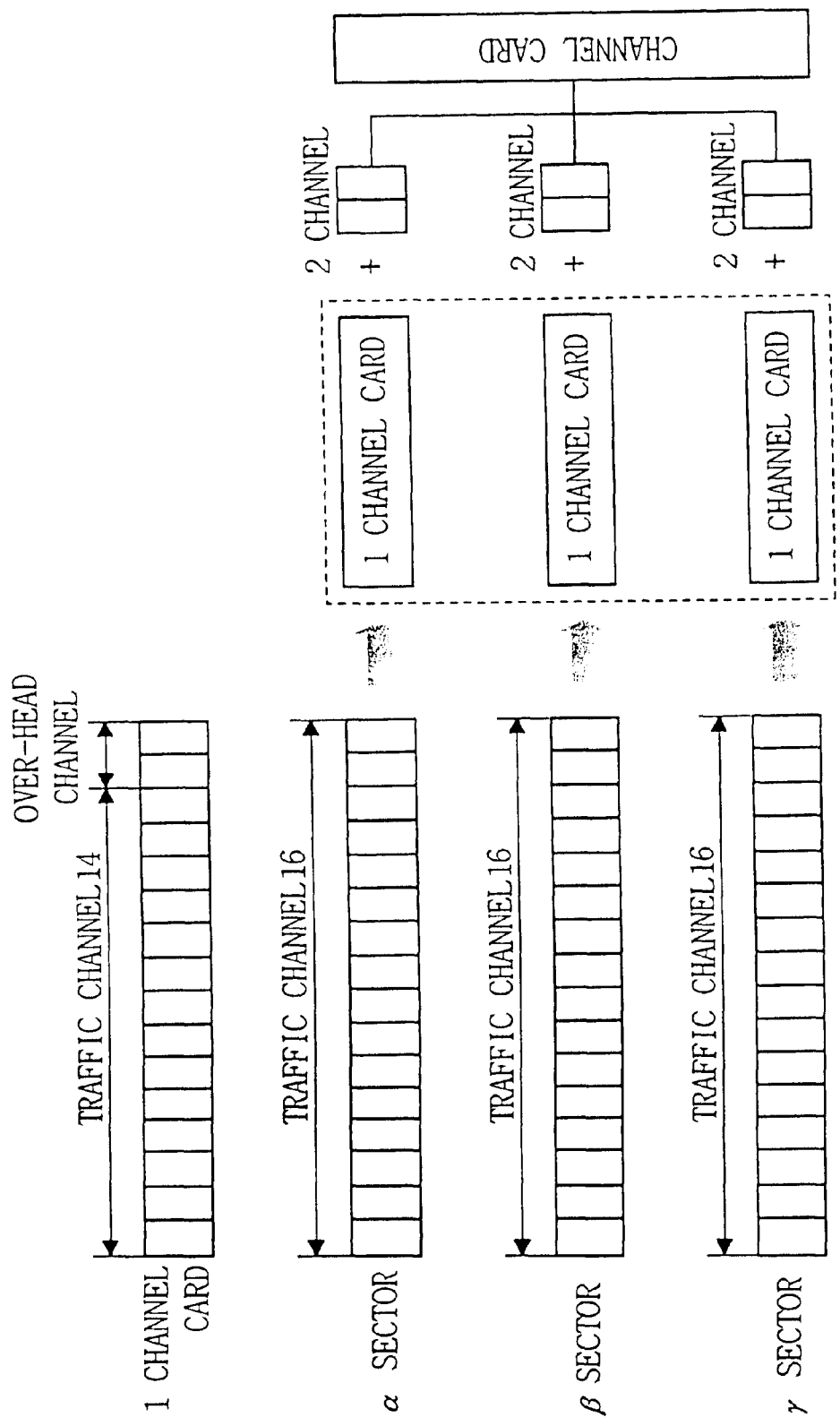
FIG. 1 is a simplified diagram illustrating the sharing of channels between sectors in accordance with an embodiment of the prior art.

As shown in FIG. 1, in the event of setting up 16 traffic channels to be accommodated in α, β, γ sectors of a base station, it is impossible accommodate all 16 traffic loads in one channel card having 16 channels since each channel card needs two overhead channels for non-traffic load purpose. Thus, each channel having 16 traffic channels needs two channel cards when no scheme is provided to share/borrow unused channels from other sectors. Thus, when there is no sharing of channels between sectors, the numbers of the total channel cards needed required in the base station having three sectors (α, β, γ) are 6. Each sector having 16 traffic channels require two channel cards, the first channel card accommodating 14 traffic channels and the second channel card accommodating the remaining 2 traffic channels. Since the second channel card for each sector merely accommodates only two traffic channels and the remaining 10 channels in the second channel card are not being used, which results in a diminished normal system utility and simplicity, and creates complexity of the system.

However, in the event that there is a sharing/borrowing channels between each sector during the traffic overload, the system only requires 4 channel cards (48÷14=3.4, 1 channel card accommodates 14 traffic channels; 3 sectors need 48 traffic channels (16 traffic channels×3 sectors)) for the 3 sectors.

As illustrated in the above, by sharing traffic channels between α, β, γ sectors, it is possible to reduce the number of required channels cards from 6 to 4 for the same system, and thus possible to improve the system utility, simplicity and weight.

Figure 2:
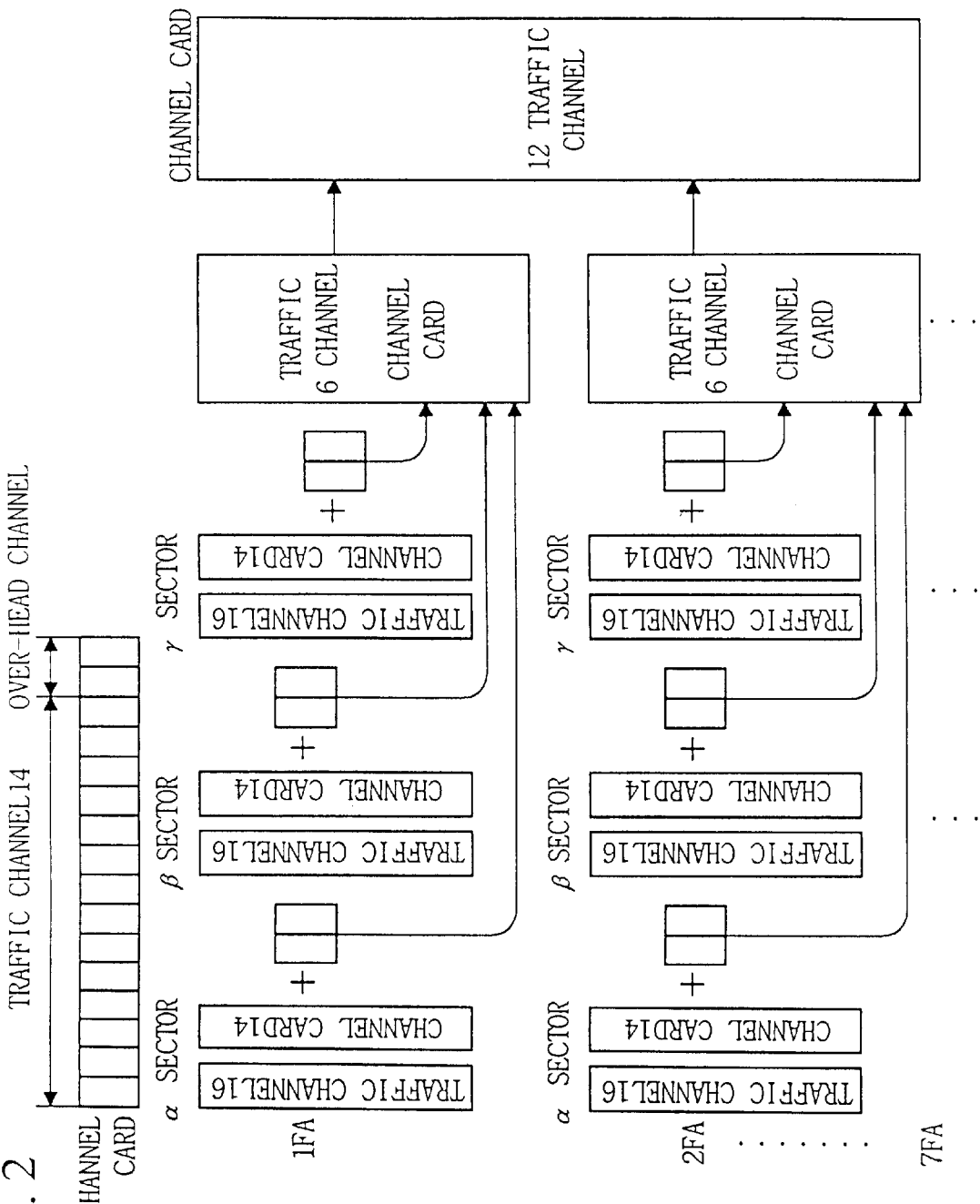
FIG. 2 is a simplified diagram illustrating the sharing of channels and frequency assignments between sectors in accordance with an embodiment of the present invention; and, FIG. 3 illustrates a flowchart of a method for sharing channels and frequency assignments between sectors in accordance with the present invention.

FIG. 2 illustrates two embodiments of the present invention for sharing channels between sectors and between FAs of the present invention. A channel card is generally comprised of 14 traffic channels and 2 overhead channels. The number of traffic channels included in each sector (α, β, γ) are typically set to 16 and the number of frequency assignments typically assigned to each sector is 7.

In according to one embodiment of the present invention, two channels from each sector are assigned to a channel card for sharing the channels between similar sectors of two or more different FAs. In another embodiment of the present invention, two channels from each sector are assigned to a channel card for sharing between each sectors (α, β, γ) in each FA during traffic overloads, and a combination of these channels from each frequency assignments are combined in another channel card to be used for sharing the channels between each frequency assignments. Since it is impossible accommodate all 16 traffic loads in one channel card due to two overhead channels which are used for non-traffic load purpose, the remaining two channels from each sector are assigned to one channel card.

Figure 3:
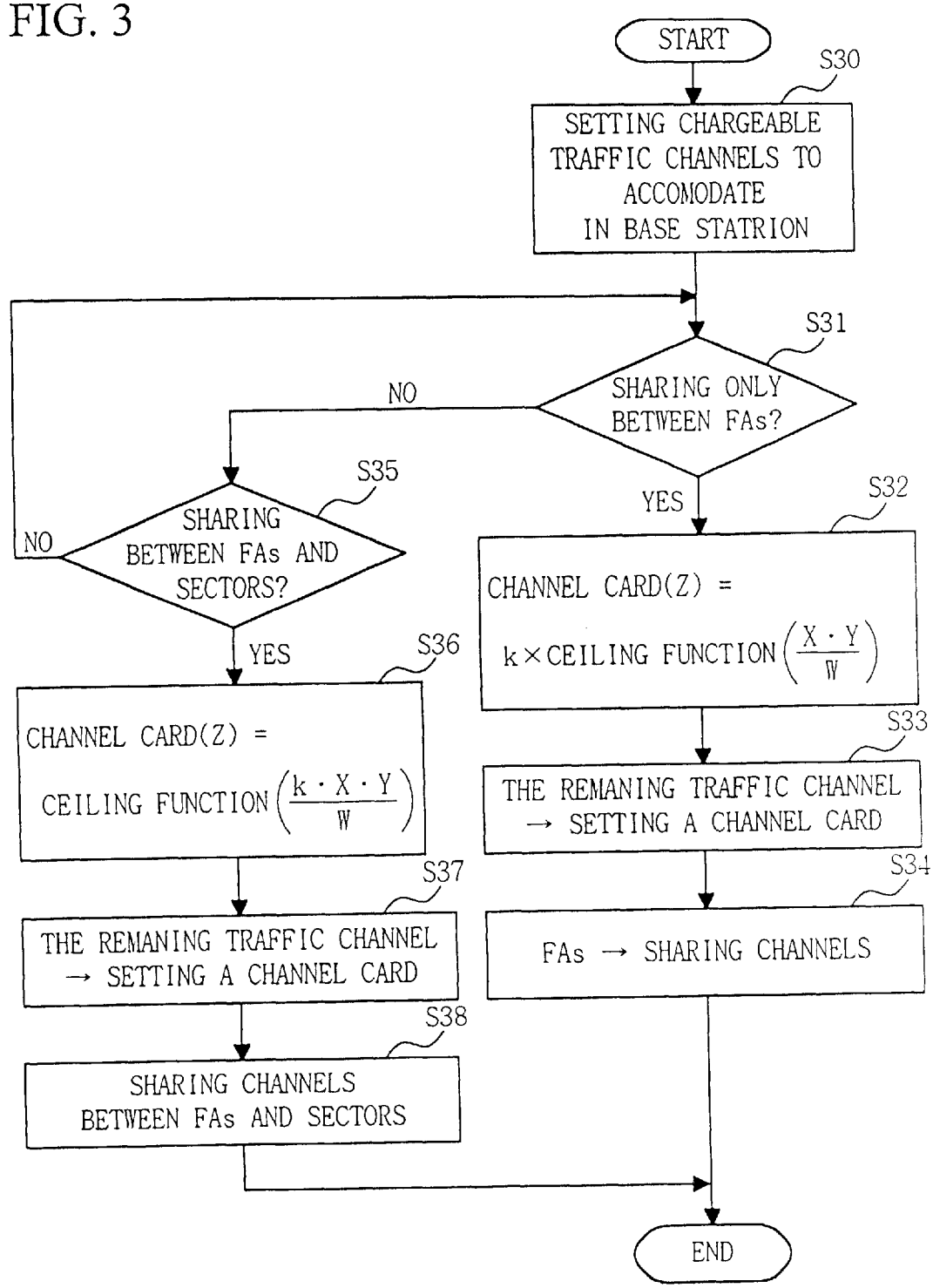

FIG. 3 is a flowchart of a method for sharing channels between sectors in each FA and/or between similar sector of multiple frequency assignments (FAs) during the traffic overload. The method includes the step of assigning (S30) traffic channels which can accommodate all call requests within a base station of CDMA system; the step of determining (S31) whether the system requires sharing channels between FAs and/or between the sectors of the base station in step (S30); in the case of sharing channels only between similar sectors of FAs in step (S31), the step of obtaining (S32) numbers (Z1) of channel cards required using a 'CEILING FUNCTION'; the step of assigning (S33) the traffic channels to the channels cards obtained in the step (S32); the step of sharing (S34) channels only between FAs.

The number of above channels cards (Z1) are determined by the following equation:

$$Z1 = k \times \text{CEILING FUNCTION}\left(\frac{XY}{W}\right),$$

wherein X represents the set traffic channels including overhead channels, Y represents the preset number of frequency assignments, W represents a total channels number for the channel card, and k represents the number of sectors in a base station.

In case of not sharing channels only between FAs (S31), the step of determining whether channels are shared between FAs and between sectors in each FA (S35); in the event that there is sharing of channels between similar sectors of FAs and between sectors in a FA in step (S35), the step of obtaining (S36) numbers (Z2) of channel cards using a 'CEILING FUNCTION'; the step of assigning (S37) the traffic channels to the channel cards obtained in the step (S36); the step of sharing (S38) channels between the channel card assigned by the step (S37) between FAs and sectors. Again, it is impossible accommodate all 16 traffic loads in one channel card due to two overhead channels which are used for non-traffic load purpose, and thereby, the remaining two channels from each sector are assigned to one channel card.

The number of channels cards (Z2) are determined by the following equation:

$$Z2 = \text{CEILING FUNCTION}\left(\frac{kXY}{W}\right),$$

wherein X represents said set traffic channels including overhead channels, Y represents the preset number of frequency assignments, W represents a total channels number for the first channel card, and k represents the number of said sectors in a base station.

The 'CEILING FUNCTION' represents the number of channel cards required to accommodate all the traffic channels including the sharing of channels between similar sector of FAs and/or between sectors of a FA. The function of 'CEILING FUNCTION' is to obtain next highest whole number. For an example, if the number of the channels cards required is determined to be 3.4, then the ceiling function of the value, 3.4, is determined to be 4. That is, four channels cards are needed to accommodate given traffic channels.

Therefore, in case of sharing channels between FAs and/or between sectors in the base station according to the present invention, it is possible to accommodate more new traffics/subscribers until the capacity of the channel card is saturated.

In order to illustrate the advantages according to the first and the second embodiments of this invention, the following comparisons are made to appreciate the objects of the present invention.

In case of non-sharing channels between sectors or FAs in the prior art, the number of channel cards is obtained by mathematical equation 1.

$$Z = \text{CEILING}\left(\frac{X}{W}\right) \times kY, \quad \text{[Equation 1]}$$

wherein X is the sum of the number of the traffic channels including overhead channels, Y is the number of FAs, and k is the number of sectors, and W is the number of channels on each channel cards.

According to the prior art, the number of channel cards is obtained by mathematical equation 2 in case of sharing channels only between sectors.

$$Z = \text{CEILING}\left(\frac{kX}{W}\right) \times Y, \quad \text{[Equation 2]}$$

wherein X is the sum of the number of the traffic channels including overhead channels, Y is the number of FAs, and k is the number of sectors, and W is the number of channels on each channel cards.

According to the present invention, in case of sharing channels only between FAs, the number of channel cards is obtained by mathematical equation 3.

$$Z = \text{CEILING}\left(\frac{XY}{W}\right) \times k, \quad \text{[Equation 3]}$$

wherein X is the sum of the number of the traffic channels including overhead channels, Y is the number of FAs, and k is the number of sectors, and W is the number of channels on each channel cards.

According to the present invention, in case of sharing channels between FAs and sectors, the number of channel cards is obtained by mathematical equation 4.

$$Z = \text{CEILING}\left(\frac{kXY}{W}\right), \quad \text{[Equation 4]}$$

wherein X is the sum of the number of the traffic channels including overhead channels, Y is the number of FAs, and k is the number of sectors, and W is the number of channels on each channel cards.

According to the above four equations, if the sum of the number of traffic channels and overhead channels (X) is set to be 18 (16+2), the number of FAs (Y) is set to be 5, the number of sectors (k) is set to be 3, and the number of the channels in one channel card is set to be 16, the number of needed channel cards is as follows:

In case of non-sharing channels between sectors or FAs according to the prior art, the required number of the channel cards (Z) is CEILING (18/16)×3×5=2×3×5=30.

$$Z = \text{CEILING}\left(\frac{X}{W}\right) \times kY \quad \text{[Equation 1]}$$

According to the prior art, in case of sharing channels only between sectors, the required number of the channel cards (Z) is CEILING (3×18/16)×5=4×5=20.

$$Z = \text{CEILING}\left(\frac{kX}{W}\right) \times Y \quad \text{[Equation 2]}$$

According to the present invention, in case of sharing channels only between FAs, the required number of the channel cards (Z) is CEILING (18×5/16)×3=6×3=18.

$$Z = \text{CEILING}\left(\frac{XY}{W}\right) \times k \quad \text{[Equation 3]}$$

According to the present invention, in case of sharing channels between FAs and between sectors, the required number of the channel cards(Z) is CEILING(18×5×3/16)=17.

$$Z = \text{CEILING}\left(\frac{kXY}{W}\right) \quad \text{[Equation 4]}$$

As illustrated in the above values, the present invention can effectively reduce the number of channel cards required in a base station through sharing channels between similar sectors of the plurality of FAs and between sectors in each FA.

One of the preferred embodiment of a channel-sharing method between base station sectors and frequency assignments (FAs) in code division multiple access (CDMA) system, the method comprising the steps of:

setting traffic channels to accommodate the subscribers' traffic occurred in the base station;

determining whether the set channels are to be shared between only FAs after setting the traffic channels;

in case the set channels are shared only between FAs, obtaining Z the number of channel cards by $$\frac{XY}{W},$$

wherein X is the sum of the set traffic channels and the overhead channels, Y is the number of FAs and W is the number of total channels per each channel card;

setting the set traffic channels to the channel cards and sharing channels using the set channel card only between FAs;

in case sectors and channels are shared between the FAs and between the sectors, obtaining Z, by calculating $$\frac{kWY}{W},$$

wherein k is the number of sectors; and setting the traffic channels to the channel cards and sharing channels using the set channel card between the sectors and FAs.

And it is preferable that in case channels are shared only between FAs, Z is obtained by calculating $$k \times \text{CEILING FUNCTION}\left(\frac{XY}{W}\right).$$

It is preferable that in case channels are shared between sectors of each FA and between similar sectors of FAs, Z is obtained by calculating the $$\text{CELILNG FUNCTION}\left(\frac{kXY}{W}\right).$$

Another preferred embodiment of a channel-sharing method between base station sectors and frequency assignments in code division multiple access (CDMA) system, the base station having a plurality of sectors and operating a plurality of FAs to provide mobile communication services by sharing the channels between the sectors during the traffic overlaods, and that the number of channel cards (Z) is obtained by calculating $$k \times \text{CEILING FUNCTION}\left(\frac{XY}{W}\right),$$

where X represents the sum of the set traffic channels and the overhead channels, Y represents the number of FAs, W represents the number of total channels per each channel card and k is the number of sectors.

Other preferred embodiment of a channel-sharing method between base station sectors and frequency assignments (FAs) in code division multiple access (CDMA) system, the base station having a plurality of sectors and operating a plurality of FAs to provide mobile communication service by sharing the channels between the sectors and between the plurality of FAs during the traffic overloads, and the number of channel cards (Z) is obtained by calculating the $$\text{CEILING FUNCTION}\left(\frac{kXY}{W}\right),$$

where X represents the sum of the set traffic channels and the overhead channels, Y represents the number of FAs, W represents the number of total channels per each channel card and k is the number of sectors.

Accordingly, the present invention provides a sharing of channels not only between sectors, but also between similar sector of multiple FAs of the base station in CDMA system. Therefore it's possible to dramatically reduce the numbers of channel cards required in a base station, which helps to enhance the system utility and simplicity, and produce lighter and less complex system.

What is claimed is:

1. A method for reducing the number of channel cards required in a base station in a code division multiple access (CDMA) by sharing channels between a plurality of frequency assignments and between a plurality of sectors of said base station during a traffic overload, said method comprising the steps of:

(a) setting a plurality of traffic channels for accommodating a plurality of requests within said base station for use of said traffic channel to transmit/receive a new call within said base station;

(b) determining whether said set traffic channels are to be shared between frequency assignments and/or between said sectors;

(c) in the event said set traffic channels are only shared between said frequency assignments, determining the number of channel cards;

(d) assigning said set traffic channels to the channels of said determined channel cards, and sharing the channels assigned in said channel cards between said frequency assignments during said traffic overload;

(e) in the event that said set traffic channels are shared between said frequency assignments and between said sectors, determining the number of channel cards; and, (f) assigning said set traffic channels to the channels of said determined channel cards, and sharing the channels assigned in said channel cards between said frequency assignments and between said sectors during said traffic overload.

2. The method as set forth in claim 1, wherein said step (c) of determining the number of said channels cards are determined by the following equation:

$$Z = k \times \text{CEILING FUNCTION}\left(\frac{XY}{W}\right),$$

wherein X represents said set traffic channels including overhead channels, Y represents the number said frequency assignments, W represents a total channels number for said channel card, and k represents the number said sectors in said base station.

3. A channel-sharing method as set forth in claim 1, wherein step (e) of determining the number of said channels cards are determined by the following equation:

$$Z = \text{CEILING FUNCTION}\left(\frac{kXY}{W}\right),$$

wherein X represents said set traffic channels including overhead channels, Y represents the number of said frequency assignments, W represents a total channels number for said channel card, and k represents the number said sectors in said base station.

4. The method as set forth in claim 2, wherein $$\text{CEILING FUNCTION}\left(\frac{XY}{W}\right)$$

corresponds to a next highest whole number.

5. The method as set forth in claim 3, wherein $$\text{CEILING FUNCTION}\left(\frac{kXY}{W}\right)$$

corresponds to a next highest whole number.

* * * * *